E. S. POND.
PORTABLE COMBINATION POWER TOOL.
APPLICATION FILED FEB. 14, 1918.
1,321,847.  Patented Nov. 18, 1919
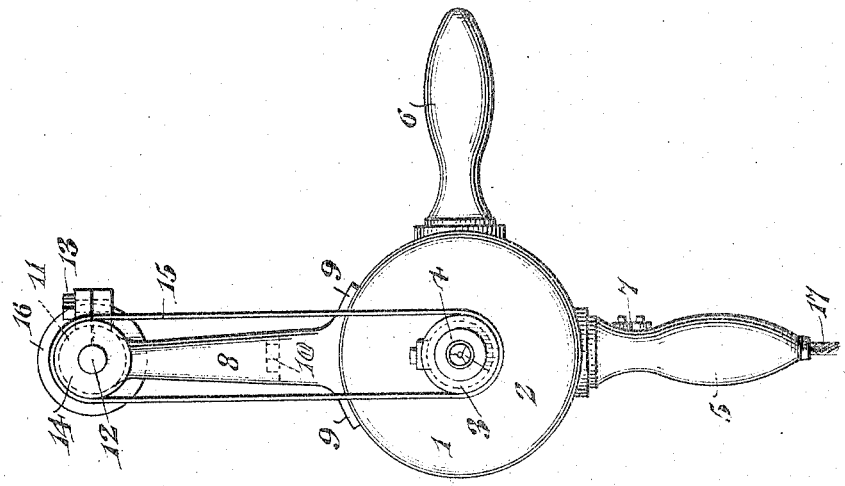
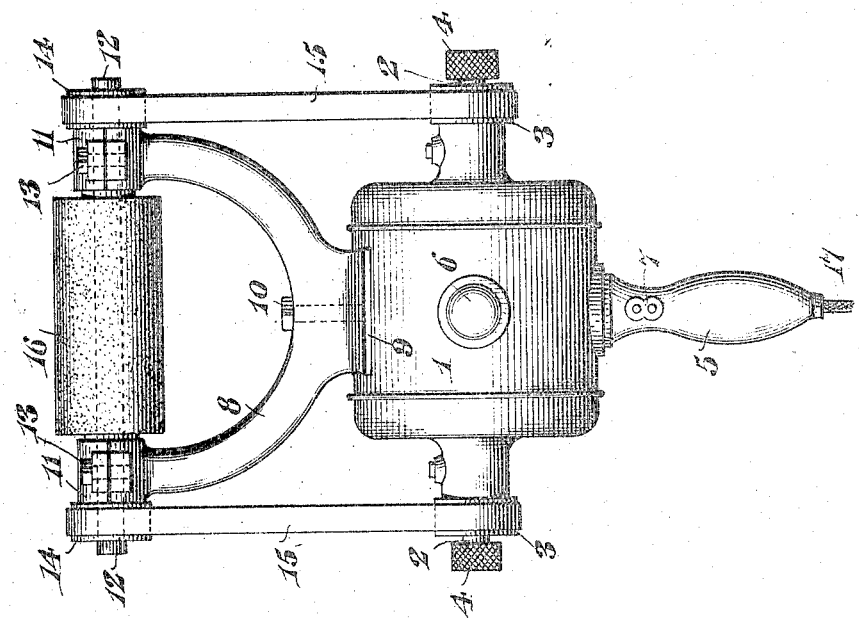
WITNESSES
Jas. K. McCathran
F. T. Chapman
INVENTOR
Ezra S. Pond,
BY C. G. Siggers
ATTORNEY

UNITED STATES PATENT OFFICE.

EZRA S. POND, OF TOLEDO, OHIO.

PORTABLE COMBINATION POWER-TOOL.

1,321,847.          Specification of Letters Patent.      Patented Nov. 18, 1919.

Application filed February 14, 1918. Serial No. 217,285.

*To all whom it may concern:*

Be it known that I, EZRA S. POND, a citizen of the United States, residing at Toledo, in the county of Lucas and State of Ohio, have invented a new and useful Portable Combination Power-Tool, of which the following is a specification.

This invention relates to portable tools capable of being driven by power and adapted to various purposes.

The object of the invention is to provide a power tool of small size that may be used in closely confined places and still be light enough to be readily carried about from place to place by hand.

The invention comprises a motor of hand size, preferably electrically driven but it may be of any other suitable type, and mounted on the motor is a yoke arranged to carry a tool shaft. The armature shaft of the motor, considering it as an electric motor, projects beyond both ends of the motor casing and is there provided with pulleys, while the tool shaft has corresponding pulleys connected to the pulleys on the armature shaft by power transmitting means such as belts. The motor is provided with suitable handles for its manipulation, and one of the handles may contain switch means for the control of the motor circuit.

The invention will be best understood from a consideration of the following detailed description taken in connection with the accompanying drawing forming a part of this specification, with the understanding, however, that the invention is not confined to any strict conformity with the showing of the drawing, but may be changed and modified so long as such changes and modifications come within the scope of the appended claim.

In the drawings:—

Figure 1 is a face view of the tool.

Fig. 2 is a side elevation of the tool.

Referring to the drawings, there is shown a motor 1 which may be taken as indicative of any suitable power device but will hereinafter be considered as an electric motor without necessarily confining the motor structure to an electric motor. The motor is provided with a through armature shaft 2 projecting beyond both ends of the motor casing, and beyond each end of the motor casing the shaft carries a pulley 3 and a chuck 4. The casing is provided with handles 5 and 6 shown as projecting from the casing at right angles one to the other for convenience of handling and permitting a firmer hold of the tool than would be the case with a single handle. One of the handles, say the handle 5, carries a switch 7 which may be of the push button type or of any other suitable type for closing and opening the circuit.

Mounted on the casing 1 on the side thereof remote from the handle 5 is a yoke or bracket 8 having a spread at the ends of its arms sufficient to accommodate any tool for which the machine is adapted. The yoke 8 has a base portion 9 curved in conformity with the curvature of the casing 1, which latter is of cylindrical outline, and having a sufficient extent to so embrace the casing that the yoke when seated thereon cannot turn on the casing. This makes it possible to secure the yoke to the casing by a single bolt or screw 10.

The ends of the arms of the yoke 8 terminate in journal bearings 11 for a tool shaft 12. The journal bearings 11 are conveniently made of the split type so that wear may be taken up by screws 13 in the customary manner. The ends of the shaft 12 carry pulleys 14 which may be similar to the pulleys 3 and connecting the pulleys 3 and 14 are belts 15 either of the plain type or of the noiseless link type, or any other suitable means of transmitting power from the shaft 2 to the shaft 12 may be used.

On the shaft 12 between the arms of the yoke 8 there is mounted, in the particular showing of the drawing, an abrasive drum 16 which may be taken as indicative of any suitable device for the purpose, whether it may be an emery wheel or drum, buffer wheel or drum, or a carborundum drum, or a sandpaper wheel, and these various devices may be of any length or diameter desired. The shaft may carry saws of different sizes for wood or metal and the chucks 4 may be used for drills or other tools of like nature. Furthermore, the tool may have gages or stops attached thereto for regulating depth of cut, but as such devices are commonly employed it is deemed unnecessary to illustrate them.

Since the motor 1 is to be considered as driven by an electric current, the handle 5 may be entered by a conductor 17 to feed the motor and be under the control of the push button switch 7. When other driving means are employed the manner of transmitting the power may be varied accordingly.

The device is particularly useful for working by hand in close places upon any type of material with avoidance of loss of time usually encountered in hand work.

In order to remove and replace tools, one or both of the pulleys 14 may be made to be readily removed from the tool shaft.

What is claimed is:

A self-contained portable balanced hand tool, comprising a power motor with a casing inclosing it, handle means directly on the casing for carrying and manipulating the tool, a power shaft driven by the motor and extending from both ends of the casing, a yoke rigidly fastened at its base to the motor casing with its arms diverging away therefrom and terminating in journal bearings, a tool shaft mounted in the bearings on the yoke and parallel with the power shaft so as to dispose the tool in spaced relation to the motor, and power transmitting belt connections between both ends of the power shaft and both ends of the tool shaft.

In testimony that I claim the foregoing as my own, I have hereto affixed my signature in the presence of two witnesses.

EZRA S. POND.

Witnesses:
BENJ. L. BOYN,
A. E. KRUSE.